US010009542B2

(12) United States Patent
Billinghurst et al.

(10) Patent No.: US 10,009,542 B2
(45) Date of Patent: *Jun. 26, 2018

(54) SYSTEMS AND METHODS FOR ENVIRONMENT CONTENT SHARING

(71) Applicant: Google LLC, Mountain View, CA (US)

(72) Inventors: Mark Nathan Billinghurst, Mountain View, CA (US); Matthew David Tait, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/589,927

(22) Filed: May 8, 2017

(65) Prior Publication Data

US 2017/0257564 A1 Sep. 7, 2017

Related U.S. Application Data

(63) Continuation of application No. 13/928,639, filed on Jun. 27, 2013, now Pat. No. 9,686,466.

(51) Int. Cl.
*H04N 5/232* (2006.01)

(52) U.S. Cl.
CPC .............. *H04N 5/23238* (2013.01)

(58) Field of Classification Search
CPC .................................. H04N 5/23238
See application file for complete search history.

(56) References Cited

U.S. PATENT DOCUMENTS

| | | | |
|---|---|---|---|
| 7,999,842 B1* | 8/2011 | Barrus | H04N 5/23238 348/37 |
| 2006/0001737 A1 | 1/2006 | Dawson et al. | |
| 2007/0237491 A1 | 10/2007 | Kraft | |
| 2008/0068284 A1* | 3/2008 | Watanabe | B60K 35/00 345/1.1 |
| 2010/0128121 A1 | 5/2010 | Wilkinson | |
| 2010/0251101 A1* | 9/2010 | Haussecker | G06T 17/05 715/243 |
| 2010/0265314 A1 | 10/2010 | Nakashio | |
| 2010/0316232 A1 | 12/2010 | Acero et al. | |
| 2010/0317399 A1 | 12/2010 | Rodriguez | |
| 2011/0052083 A1 | 3/2011 | Rekimoto | |
| 2011/0173565 A1* | 7/2011 | Ofek | G09B 29/00 715/790 |
| 2011/0199479 A1* | 8/2011 | Waldman | G01C 21/3602 348/116 |
| 2012/0033028 A1 | 2/2012 | Murphy et al. | |

(Continued)

*Primary Examiner* — Jamie Atala
*Assistant Examiner* — Hesham Abouzahra
(74) *Attorney, Agent, or Firm* — McDonnell Boehnen Hulbert & Berghoff LLP

(57) ABSTRACT

Embodiments described herein may help to provide methods for sharing and viewing part of an environment of a computing device, such as a head-mountable device (HMD). An example method involves: (a) determining a still photo panorama of an environment, (b) receiving a video stream of a first portion of the environment from a video camera on a sharing device, (c) determining a registration data stream, where the registration data stream indicates a location and an orientation of the video stream within the still photo panorama of the environment; and (d) transmitting the video stream and the registration data stream to one or more viewing devices.

20 Claims, 16 Drawing Sheets

(56) References Cited

U.S. PATENT DOCUMENTS

| | | |
|---|---|---|
| 2012/0075168 A1* | 3/2012 | Osterhout ............ G02B 27/017 |
| | | 345/8 |
| 2012/0320013 A1 | 12/2012 | Perez et al. |
| 2012/0320149 A1 | 12/2012 | Kim et al. |
| 2013/0073775 A1 | 3/2013 | Wade et al. |
| 2013/0127980 A1 | 5/2013 | Haddick et al. |
| 2013/0131985 A1* | 5/2013 | Weiland ................ G01C 21/20 |
| | | 701/516 |
| 2014/0247325 A1* | 9/2014 | Wu .................... H04N 5/23206 |
| | | 348/39 |

* cited by examiner

SYSTEMS AND METHODS FOR ENVIRONMENT CONTENT SHARING

CROSS REFERENCE TO RELATED APPLICATIONS

The present application claims priority to U.S. patent application Ser. No. 13/928,639 filed on Jun. 27, 2013 and entitled "Systems and Methods for Environment Content Sharing," which is herein incorporated by reference as if fully set forth in this description.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. For instance, a user may be presented with a computer-simulated environment that may simulate physical presence in places in the real world, as well as in imaginary worlds. Such applications can be mission-critical or safety-critical, such as in a public safety or aviation setting. The applications can also be recreational, such as interactive gaming. Many other applications are also possible.

SUMMARY

Example embodiments help to provide methods for sharing and viewing part of an environment of a computing device, such as a head-mountable device (HMD). In particular, a still photo panorama of an environment may be determined. A video stream of a portion of the environment may be received. Additionally, a registration data stream indicating the location and orientation of the video stream within the panorama may be determined. Further, the video stream and the registration data stream may be transmitted to one or more viewing devices. The viewing devices may provide a display containing the panorama and the video stream, where the video stream is moving relative to the panorama based on the registration data stream. The display may contain a field of view that is separately moveable by the viewers.

In one aspect, a computer-implemented method may involve: (a) determining a still photo panorama of an environment, (b) receiving a video stream of a first portion of the environment from a video camera on a sharing device, (c) determining a registration data stream, where the registration data stream indicates a location and an orientation of the video stream within the still photo panorama of the environment; and (d) transmitting the video stream and the registration data stream to one or more viewing devices.

In an additional aspect, a computer-implemented method may involve: (a) receiving a still photo panorama of an environment, (b) receiving a video stream of a first portion of the environment, (c) receiving a registration data stream, where the registration data stream indicates a location and an orientation of the video stream within the still photo panorama of the environment, (d) and displaying the still photo panorama and the video stream in a display, where: (1) the video stream is moving within the display relative to the still photo panorama based at least in part on the registration data stream and (2) a field of view of the display is movable within the still photo panorama.

In another aspect, a non-transitory computer readable medium has stored therein instructions executable by a computing device to cause the computing device to perform functions comprising: (a) determining a still photo panorama of an environment, (b) receiving a video stream of a first portion of the environment from a video camera on a sharing device, (c) determining a registration data stream, where the registration data stream indicates a location and an orientation of the video stream within the still photo panorama of the environment; and (d) transmitting the video stream and the registration data stream to one or more viewing devices.

In yet another aspect, example embodiments may provide for: (a) means for determining a still photo panorama of an environment, (b) means for receiving a video stream of a first portion of the environment from a video camera on a sharing device, (c) means for determining a registration data stream, where the registration data stream indicates a location and an orientation of the video stream within the still photo panorama of the environment, and (d) means for transmitting the video stream and the registration data stream to one or more viewing devices.

In yet a further aspect, example embodiments may provide for: (a) means for receiving a still photo panorama of an environment, (b) means for receiving a video stream of a first portion of the environment, (c) means for receiving a registration data stream, where the registration data stream indicates a location and an orientation of the video stream within the still photo panorama of the environment, (d) and means for displaying the still photo panorama and the video stream in a display, where: (1) the video stream is moving within the display relative to the still photo panorama based at least in part on the registration data stream and (2) a field of view of the display is movable within the still photo panorama.

These as well as other aspects, advantages, and alternatives will become apparent to those of ordinary skill in the art by reading the following detailed description, with reference where appropriate to the accompanying drawings.

DETAILED DESCRIPTION

Figure 1A:
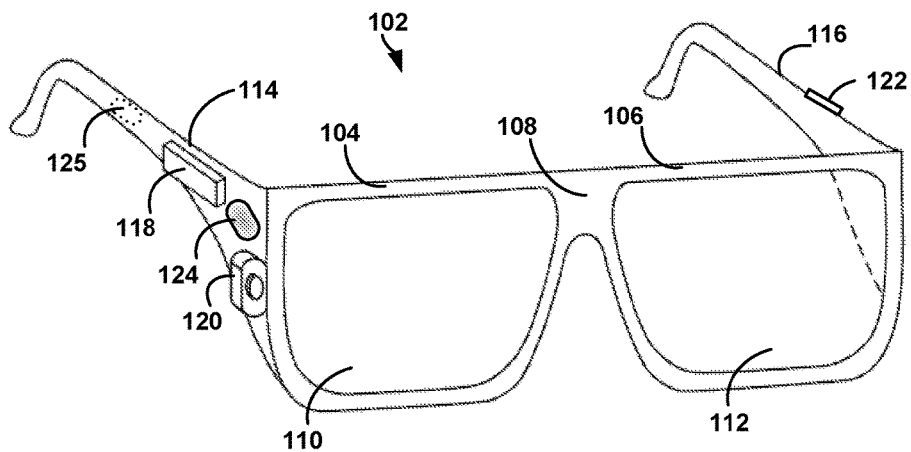
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

HMD's (head-mounted displays) may allow users to share parts of their environment with others in a variety of possible ways. An HMD may contain photo cameras, video cameras, and/or audio sensors that allow its user to capture various aspects of the environment, for example. Such media content may be transmitted to other users directly or through a backend network, such as a remote, cloud-based server system. A user that views the media content in real time on a remote device may then share in the experience of the sending user (e.g., by playing the pictures, video, and/or audio recordings on the remote user's own devices such as HMD's, smartphones, or computers).

In an example embodiment, the user of the HMD may first capture a still photo panorama of his environment. The HMD user may be signaled to look around his or her environment while the camera captures a number of still photos, in order to capture a sufficient portion of the environment for a panorama. In some examples, a still photo may be captured every time the user moves her head by a certain amount. A still photo panorama may then be generated by stitching together the still photos of the environment. The head orientation of the HMD user may be used to improve the stitching process. For example, an HMD may contain one or more sensors that track head movement and/or head orientation of the user. Head orientation data from these sensors may be used to improve the stitching process.

The panorama may be sent to the receivers after a certain portion of the environment is captured (for example, 180 degrees or the full 360 degrees). Additionally, the HMD user may also control when to start sending the panorama. The panorama could be sent all at once, or piece by piece. The panorama may also be updated as more current pictures are taken.

In another example, the panorama may also be generated based in part on images captured by other HMD's. For example, one could envision a football stadium with multiple HMD users. Images could be captured by separate HMD's and then stitched together in order to transmit a more accurate panorama to receivers.

In a further example, the panorama could incorporate images taken at an earlier time. These images may be images captured by the HMD user, by a different HMD user, or from some other source. In an alternative example, the entire still photo panorama may be created from previously stored images. Accordingly, the panorama may be predetermined instead of being sent by the HMD user.

The HMD user may also capture a live video stream of a certain view within her environment. For instance, the HMD may contain a video camera that allows the user to pan the environment and record a video stream from a certain viewpoint within that environment. Additionally, a registration data stream representing the location and orientation of the video stream within the still photo panorama may also be determined. The location and orientation of the video stream within the panorama may be determined based on the orientation of the HMD, among other things. In some examples, the head orientation of the user may be determined using orientation sensor data from one or more head orientation sensors on the HMD. In other examples, computer vision techniques may be used to determine user head orientation from relative motion analysis.

The video stream and the registration data stream representing the location and orientation of the video stream within the still photo panorama may be sent to one or more viewing devices. In some examples, the still photo panorama or portions of the still photo panorama may also be sent to the viewing devices. The panorama and/or portions of the panorama may be updated periodically or continuously. For instance, each time the user moves her head in a direction of a previously captured image, a new image may be captured and may replace the previous portion of the panorama. In further examples, the sender may control when to start, stop, and/or pause sending of the video stream to the viewing devices.

A viewing device may be a device that allows its user to navigate the environment. For example, another HMD, a computer with a mouse, or a smartphone could be used to receive the panorama and live video stream. The viewing device may also receive a registration data stream indicating the location and orientation of the live video stream within the panorama. Accordingly, the viewing device may display an augmented panorama that contains a video stream that is moving within the panorama based on the registration data stream. Additionally, the field of view of the viewing device may also be separately moveable within the augmented panorama.

Accordingly, the users of the viewing devices may control their orientation to view the live video stream of the sender. The users of the viewing devices may also look around the environment in other directions than the sender's direction by panning around the still photo panorama. If there are multiple viewing devices, each viewer may be able to view a different section of the environment at the same time. In an example embodiment, the field of view of the viewing devices may be the same size as the live video stream. The entire video stream may then fit within the viewer's field of view.

The sender may also be able to send audio signals to the receivers. For example, the HMD may include microphones located over the ears that could capture spatial audio data from the environment. Additionally, the HMD may include microphones near the user's mouth that could capture non-spatial voice communication from the HMD user. The spatial audio data and non-spatial audio data could be layered together so that receivers could differentiate the sound of the sender's voice from the background noise in the environment.

Visual cues such as arrows or triangles could also be used in order to tell each individual where the other individual(s) are looking. For instance, the visual cues may indicate to the receivers where the sender is looking so that the receivers can align their views with the sender and view the live video stream. Additionally, visual cues may indicate to the sender where one or more of the receivers are looking. Accordingly, the sender may choose to look in a direction that is of interest to the receivers. If there are multiple viewers, each viewer may also be signaled where the other viewers are currently looking.

In another example, there may be multiple video streams captured within a still photo panorama. For instance, a sharing device may contain multiple video cameras each capturing a separate video stream. Alternatively, multiple sharing devices may each contain one or more video cameras that is capturing a separate video stream. The multiple video streams could be combined by a computing system, such as a backend network, in order to transmit a single viewing experience to one or more viewing devices. The viewers may then view any one of the live video streams, and may also view other sections of the environment by panning around the still photo panorama. In a further example, the still photo panorama may be created and/or updated based on pictures taken by multiple viewing devices.

The entire sharing experience may also be recorded for playback. One or more receivers may then view the pan-orama and live video stream at a later time after the recording is complete. The recording may include all of the video and still image content as well as any spatial and non-spatial audio content captured during the sharing experience. Each playback experience may be different because the receiver may look around the panorama in different directions each time.

II. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

It should be understood, however, that example systems may also be implemented in or take the form of other devices, such as a mobile phone, a tablet computer, or a personal computer, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes a non-transitory computer readable medium having such program instructions stored thereon.

An HMD may generally be any display device that is capable of being worn on the head and, when worn, is configured to place a display in front of one or both eyes of the wearer. An HMD may take various forms such as a helmet or eyeglasses. As such, references to "eyeglasses" or a "glasses-style" HMD should be understood to refer to any HMD that has a glasses-like frame so that it can be worn on the head. Note, however, that a glasses-style HMD may or may not include a lens in front of one or both eyes. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touchpad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touchpad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touchpad 124 is shown on the extending side-arm 114 of the HMD 102. However, the finger-operable touchpad 124 may be positioned on other parts of the HMD 102. Also, more than one finger-operable touchpad may be present on the HMD 102. The finger-operable touchpad 124 may be used by a user to input commands. The finger-operable touchpad 124 may sense at least one of a pressure, position and/or a movement of one or more fingers via capacitive sensing, resistance sensing, or a surface acoustic wave process, among other possibilities. The finger-operable touchpad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touchpad surface. In some embodiments, the finger-operable touchpad 124 may be formed of one or more translucent or transparent insulating layers and one or more translucent or transparent conducting layers. Edges of the finger-operable touchpad 124 may be formed to have a raised, indented, or roughened surface, so as to provide tactile feedback to a user when the user's finger reaches the edge, or other area, of the finger-operable touchpad 124. If more than one finger-operable touchpad is present, each finger-operable touchpad may be operated independently, and may provide a different function.

In a further aspect, HMD 102 may be configured to receive user input in various ways, in addition or in the alternative to user input received via finger-operable touchpad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
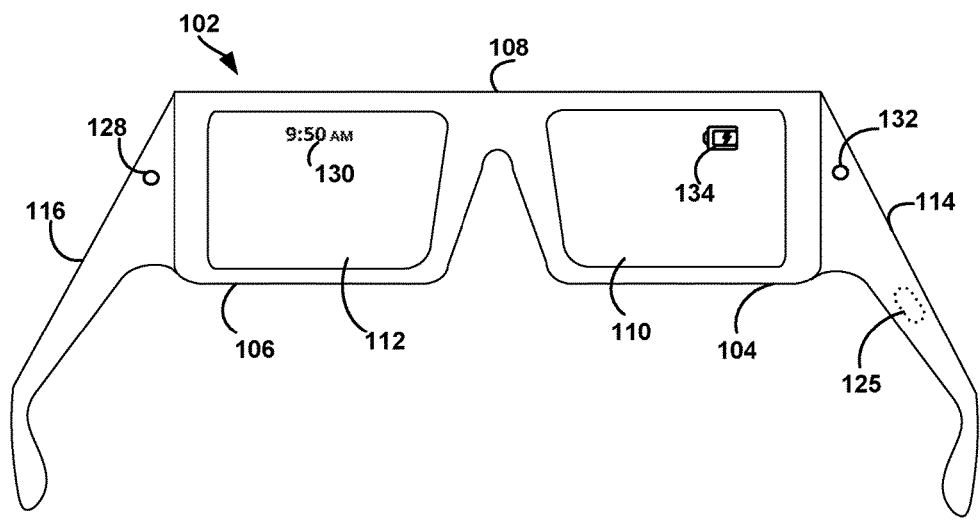
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
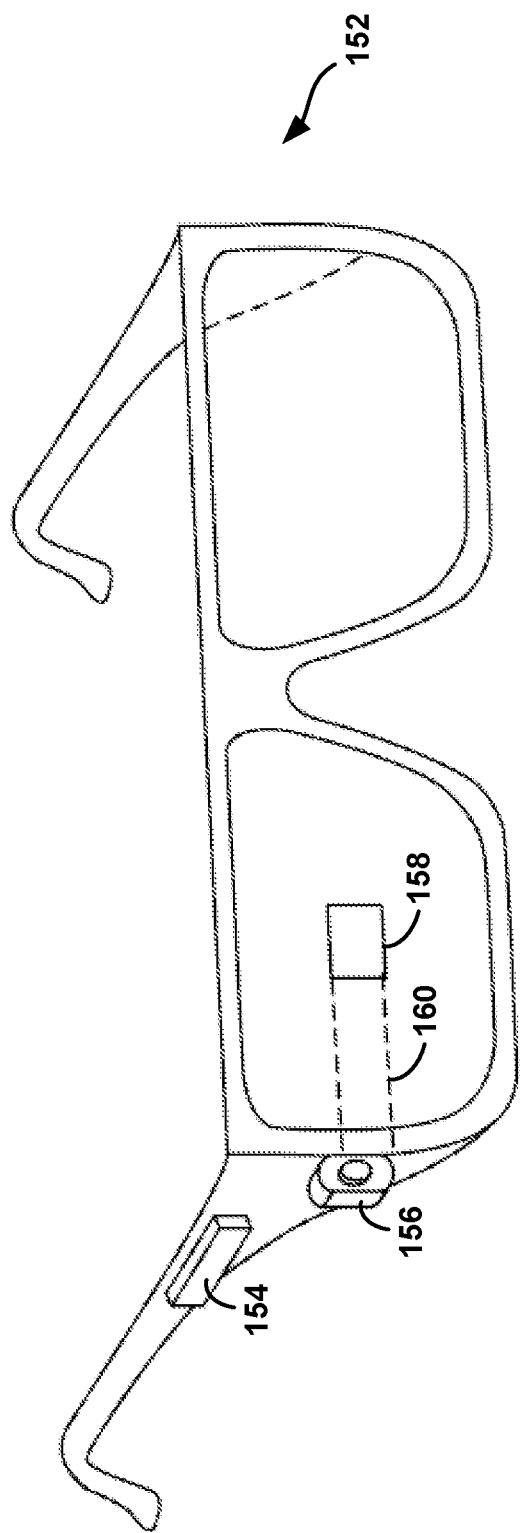
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
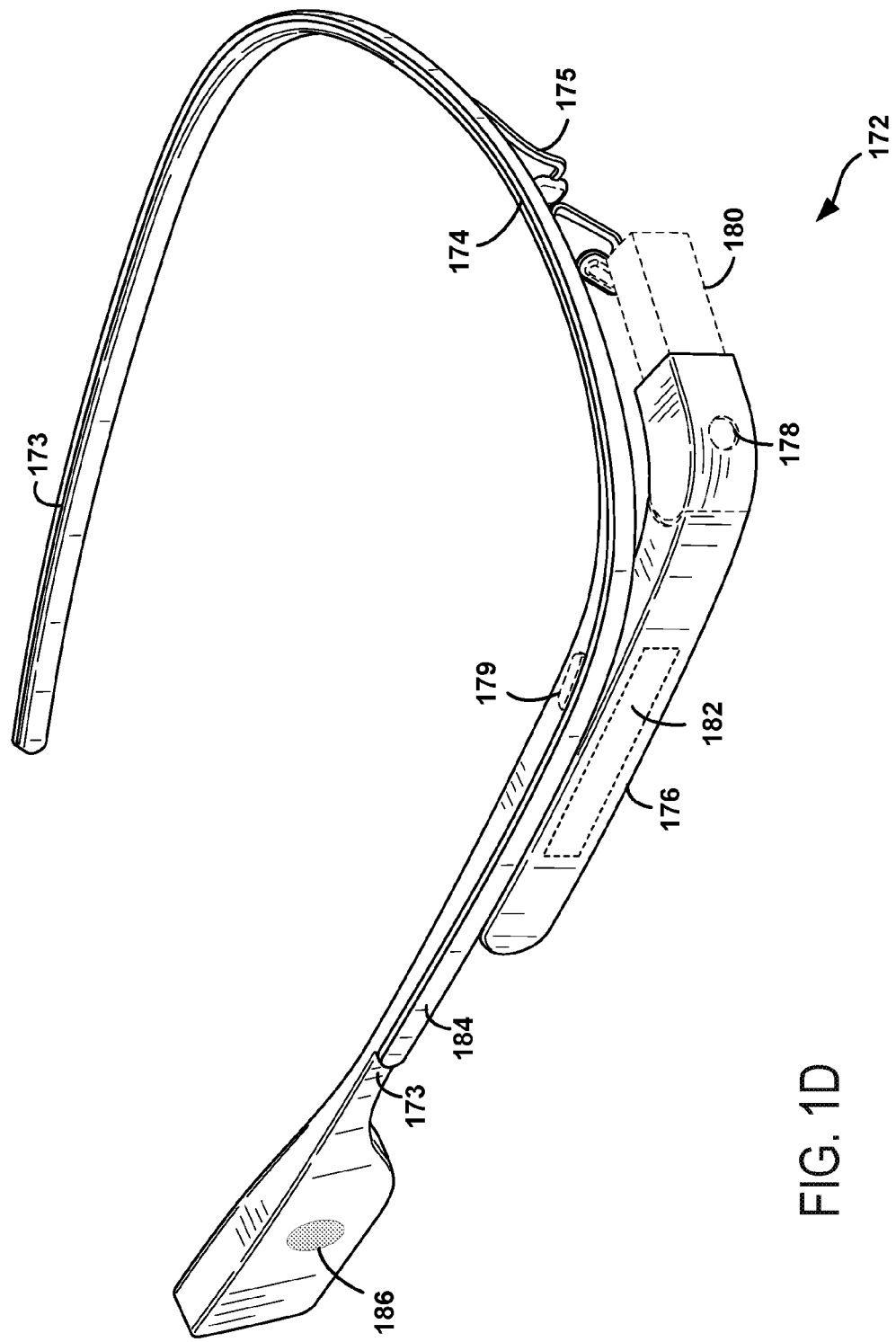
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
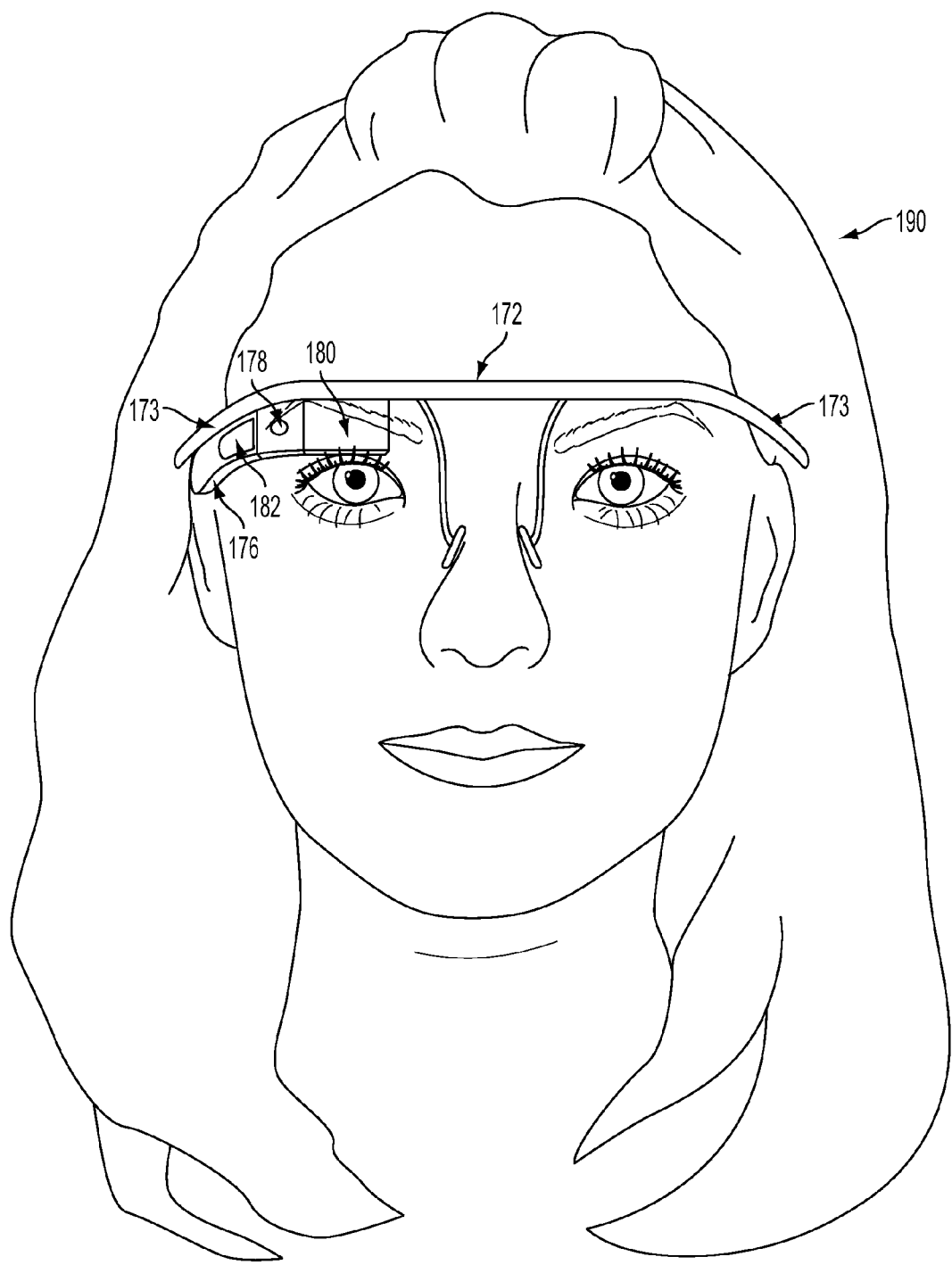
FIGS. 1E to 1G are simplified illustrations of the wearable computing system shown in FIG. 1D, being worn by a wearer.
Figure 1F:
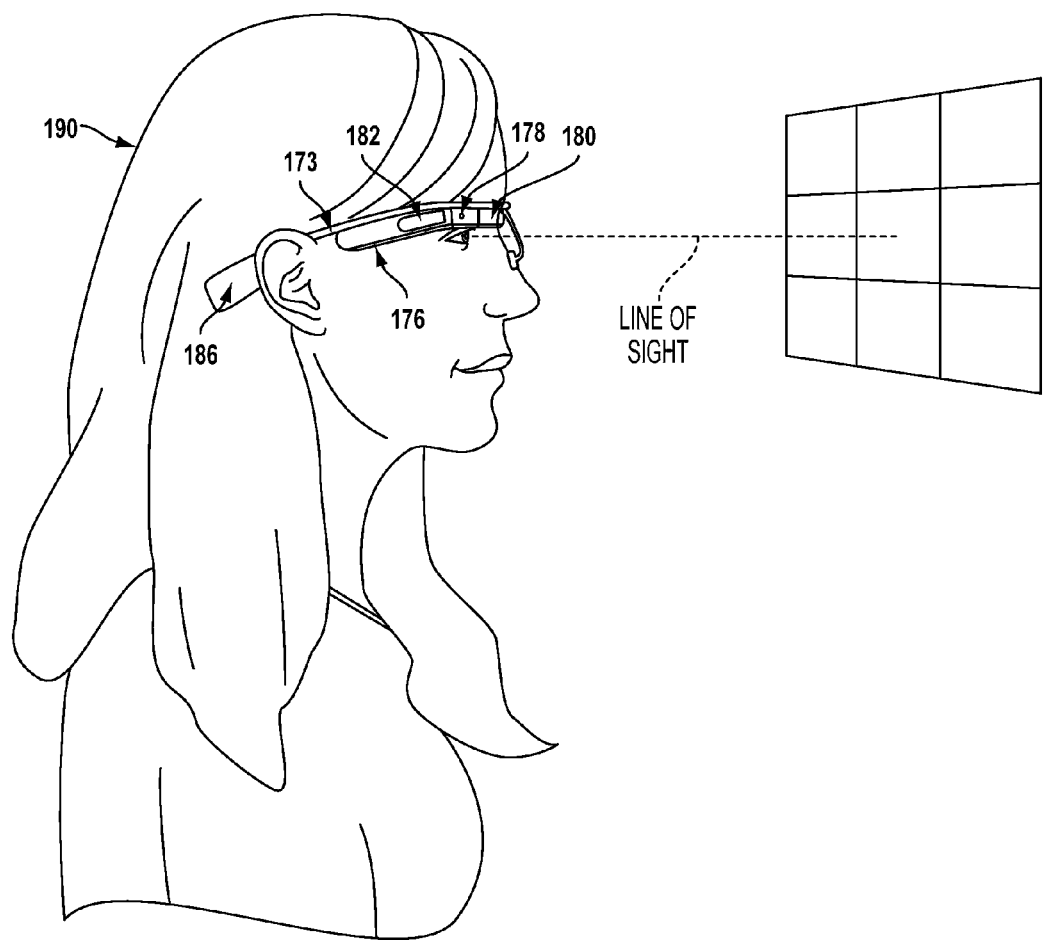
Figure 1G:
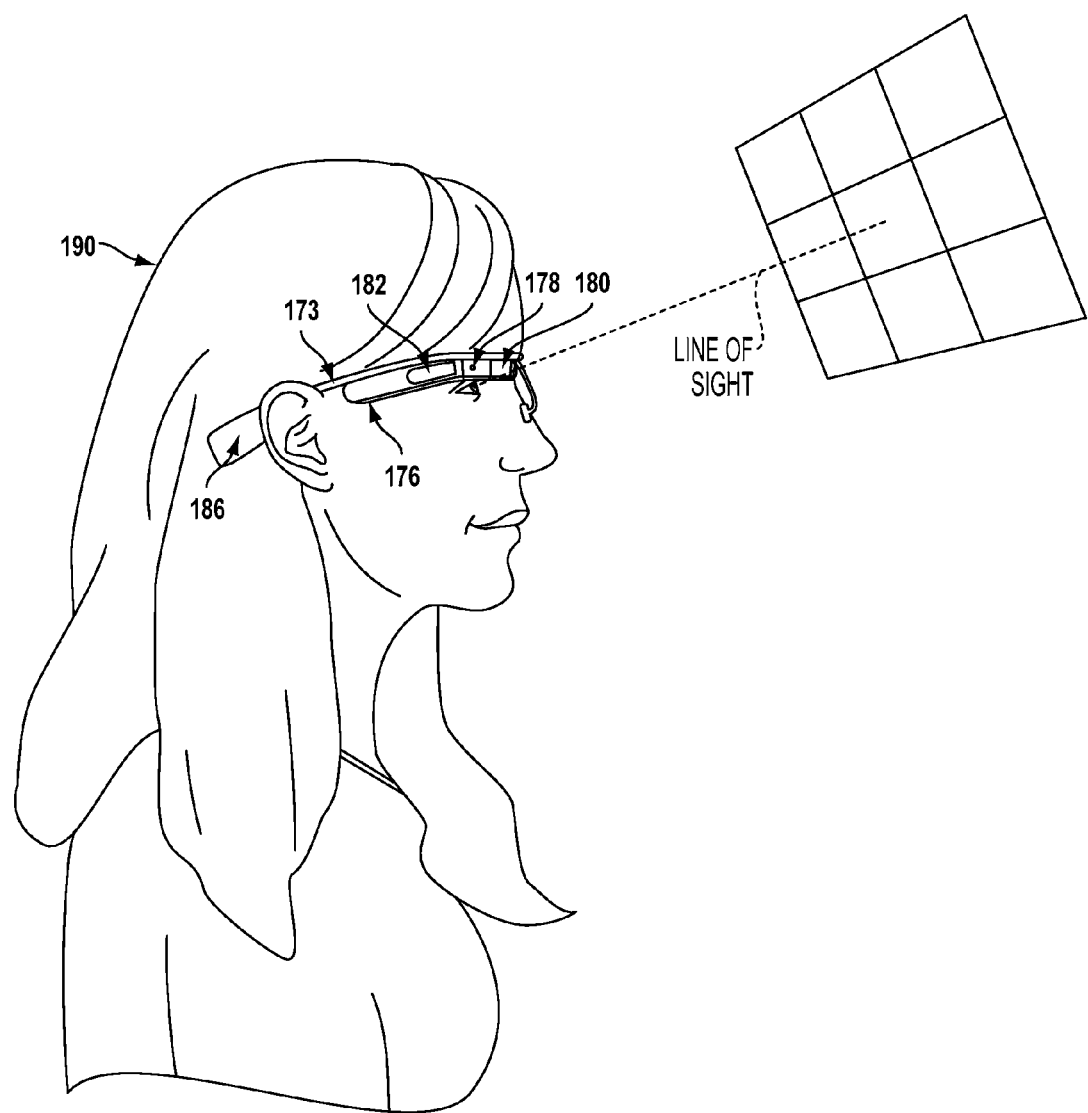

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2A:
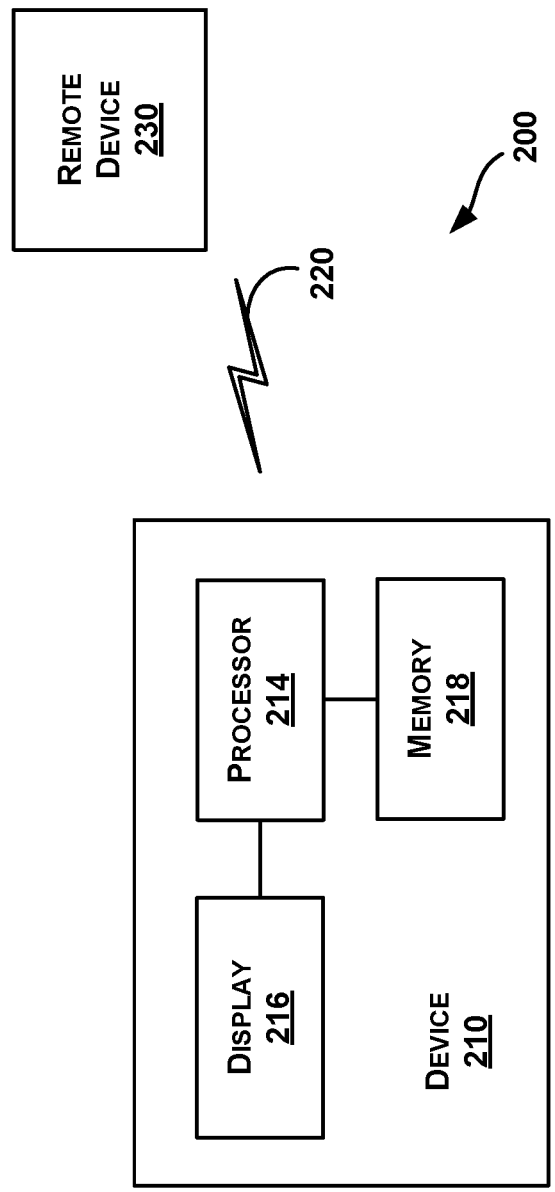
FIG. 2A is a simplified block diagram of a computing device according to an example embodiment.

FIG. 2A is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G.

The device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2A, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 2B:
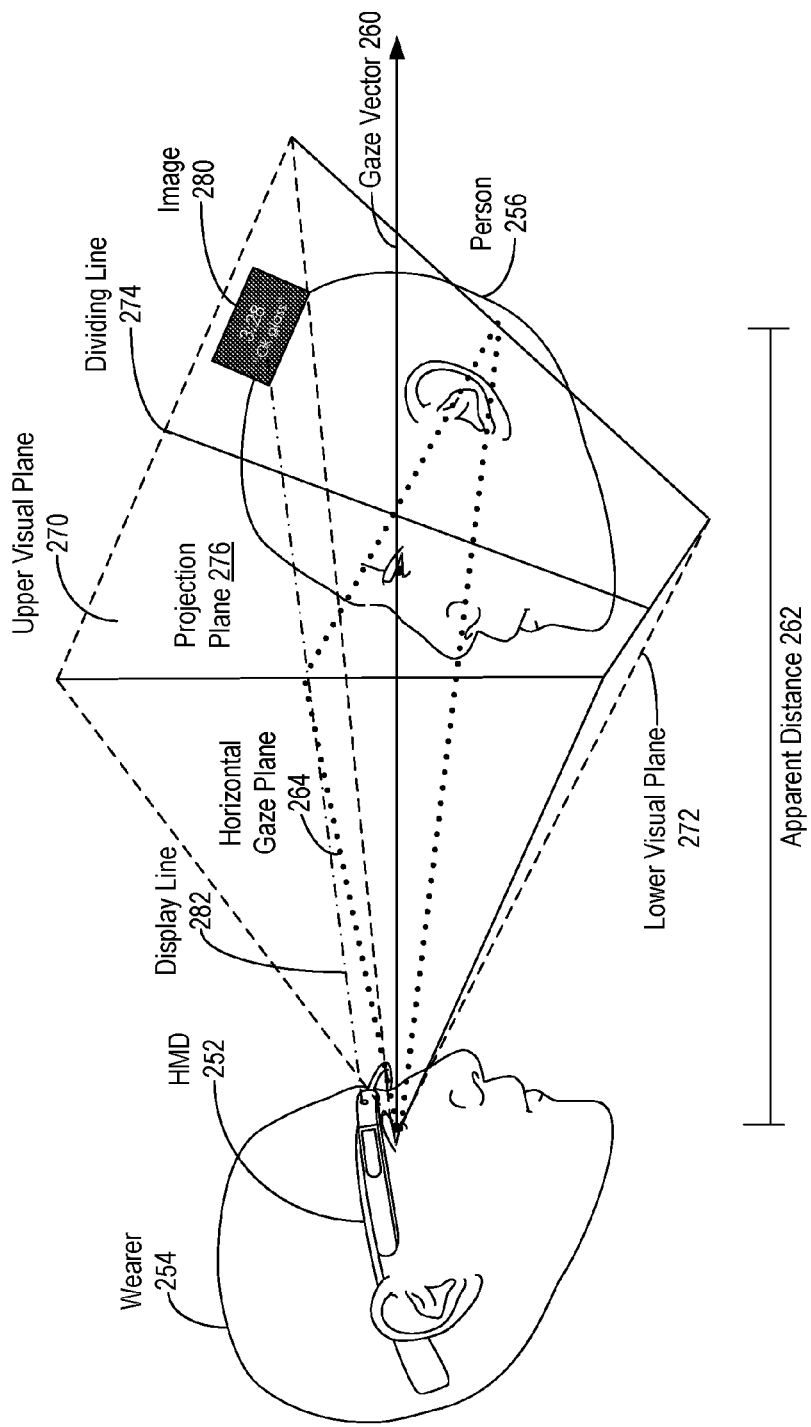
FIG. 2B shows a projection of an image by a head-mountable device, according to an example embodiment.

FIG. 2B shows an example projection of UI elements described herein via an image 280 by an example head-mountable device (HMD) 252, according to an example embodiment. Other configurations of an HMD may be also be used to present the UI described herein via image 280. FIG. 2B shows wearer 254 of HMD 252 looking at an eye of person 256. As such, wearer 254's gaze, or direction of viewing, is along gaze vector 260. A horizontal plane, such as horizontal gaze plane 264 can then be used to divide space into three portions: space above horizontal gaze plane 264, space in horizontal gaze plane 264, and space below horizontal gaze plane 264. In the context of projection plane 276, horizontal gaze plane 260 appears as a line that divides projection plane into a subplane above the line of horizontal gaze plane 260, a subplane a subspace below the line of horizontal gaze plane 260, and the line where horizontal gaze plane 260 intersects projection plane 276. In FIG. 2B, horizontal gaze plane 264 is shown using dotted lines.

Additionally, a dividing plane, indicated using dividing line 274 can be drawn to separate space into three other portions: space to the left of the dividing plane, space on the dividing plane, and space to right of the dividing plane. In the context of projection plane 276, the dividing plane intersects projection plane 276 at dividing line 274. Thus the dividing plane divides projection plane into: a subplane to the left of dividing line 274, a subplane to the right of dividing line 274, and dividing line 274. In FIG. 2B, dividing line 274 is shown as a solid line.

Humans, such wearer 254, when gazing in a gaze direction, may have limits on what objects can be seen above and below the gaze direction. FIG. 2B shows the upper visual plane 270 as the uppermost plane that wearer 254 can see while gazing along gaze vector 260, and shows lower visual plane 272 as the lowermost plane that wearer 254 can see while gazing along gaze vector 260. In FIG. 2B, upper visual plane 270 and lower visual plane 272 are shown using dashed lines.

The HMD can project an image for view by wearer 254 at some apparent distance 262 along display line 282, which is shown as a dotted and dashed line in FIG. 2B. For example, apparent distance 262 can be 1 meter, four feet, infinity, or some other distance. That is, HMD 252 can generate a display, such as image 280, which appears to be at the apparent distance 262 from the eye of wearer 254 and in projection plane 276. In this example, image 280 is shown between horizontal gaze plane 264 and upper visual plane 270; that is image 280 is projected above gaze vector 260. In this example, image 280 is also projected to the right of dividing line 274. As image 280 is projected above and to the right of gaze vector 260, wearer 254 can look at person 256 without image 280 obscuring their general view. In one example, the display element of the HMD 252 is translucent when not active (i.e. when image 280 is not being displayed), and so the wearer 254 can perceive objects in the real world along the vector of display line 282.

Other example locations for displaying image 280 can be used to permit wearer 254 to look along gaze vector 260 without obscuring the view of objects along the gaze vector. For example, in some embodiments, image 280 can be projected above horizontal gaze plane 264 near and/or just above upper visual plane 270 to keep image 280 from obscuring most of wearer 254's view. Then, when wearer 254 wants to view image 280, wearer 254 can move their eyes such that their gaze is directly toward image 280.

III. Example Methods

A. Capturing and Transmitting a Panorama and a Video Stream to Viewing Devices

As noted above, experience sharing generally involves a user sharing media that captures her experience with one or more other users. In an exemplary embodiment, a user may use a wearable computing device, such as an HMD, or a different type of computing device to capture media that conveys the world as she is experiencing it. The user may then transmit this media to others so they may share her experience. For example, a user may share a point-of-view video feed captured by a video camera on a head-mounted display of her wearable computer. A user may also share a still photo panorama of her environment created from pictures taken by cameras on the wearable computing device. Additionally, a user may share a real-time audio feed from a microphone of her wearable computing device. Many other examples are possible as well.

The computing device that is sharing a user's experience may be referred to as a "sharing device" or a "sharer" or a "sending device" or a "sender," while the computing device or devices that are receiving real-time media from the sharer may each be referred to as a "viewing device" or a "viewer" or a "receiving device" or a "receiver." A wide range of possible computing devices could be used as both the sharing devices and the viewing devices. Examples given in the context of specific types of devices are not meant to be limiting.

In some exemplary embodiments, a remote server may help reduce the sharer's processing load. In such embodiments, the sharing device may send certain data captured about its environment to a remote, cloud-based server system, which may function to distribute the data to the appropriate viewing devices. In some examples, a remote server system may perform some or all of the necessary data processing (e.g., stitching together captured images into a still-photo panorama) in order to reduce the load on the sharing devices. As part of a cloud-based implementation, the sharer may communicate with the server through a wireless connection, through a wired connection, or through a network of wireless and/or wired connections. The server may likewise communicate with the one or more viewers through a wireless connection, through a wired connection, or through a network of wireless and/or wired connections.

Figure 3:
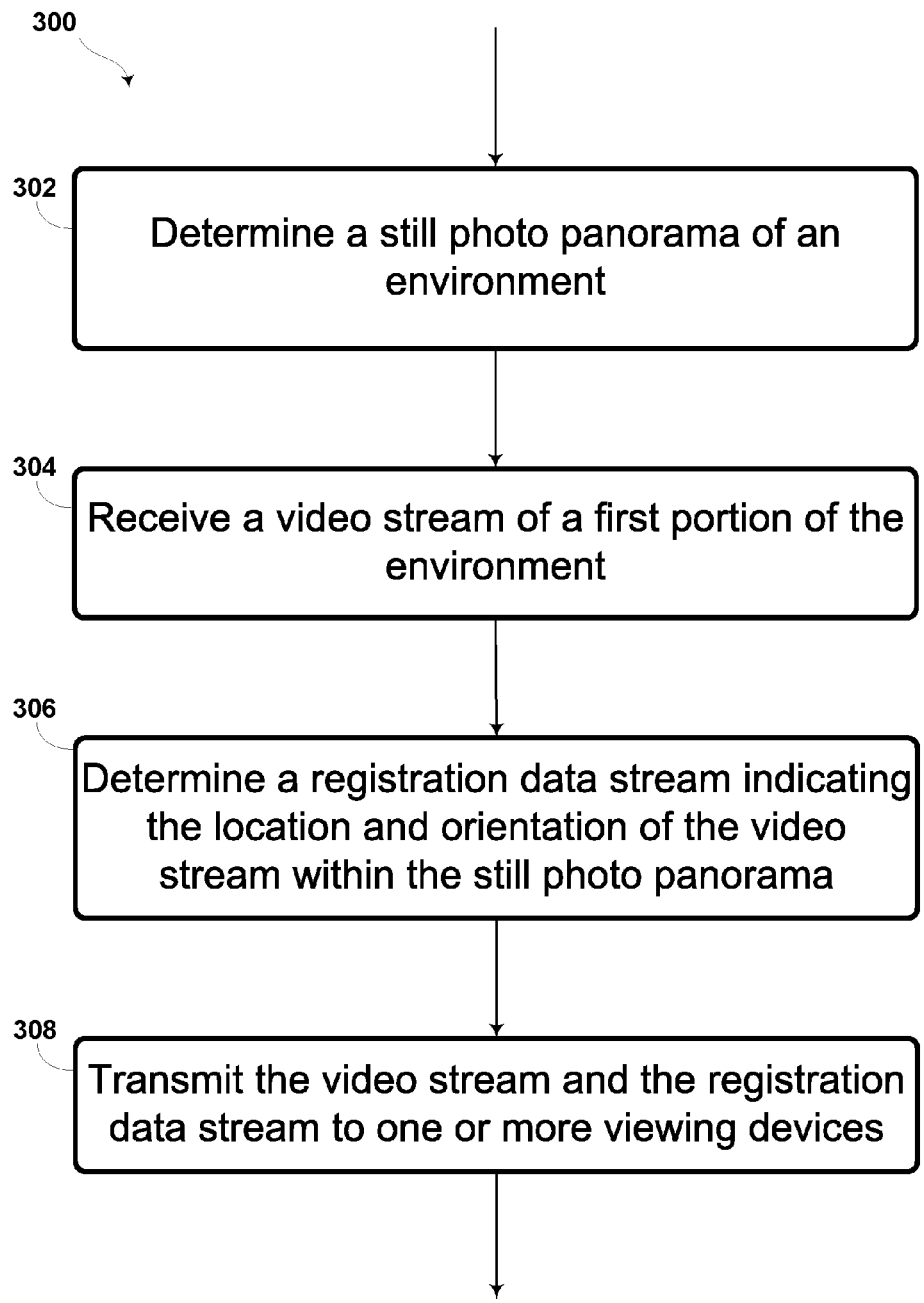
FIG. 3 is a flow chart illustrating a method, according to an example embodiment.

FIG. 3 is a flow chart illustrating a method 300, according to an example embodiment. In particular, method 300 may be implemented to combine a still photo panorama of an environment with a video stream of a certain view of the environment captured by a video camera on a sharing device in order to transmit a viewing experience to one or more receiving devices. In one example, method 300 may be carried out by a sharing device, which may be a wearable computing device such as an HMD or a different type of computing device such as a smartphone. In further examples, method 300 may be carried out by a backend server system such as a cloud-based server system that is in communication with a sharing device.

More specifically, method 300 may involve determining a still photo panorama of an environment, as shown by block 302. The method 300 may further involve receiving a video stream of a portion of the environment, as shown by block 304. The method 300 may additionally involve determining a registration data stream which indicates the location and orientation of the video stream within the still photo panorama, as shown by block 306. Further, the method 300 may involve transmitting the video stream and the registration data stream to one or more viewing devices, as shown by block 308.

The step 302 of method 300 may involve determining a still photo panorama of an environment. The still photo panorama may include 2D and/or 3D images. The still photo panorama may be a picture of a certain portion of the environment of a sharing device which may be the result of combining several photos of the environment. These photos may include photos taken by one or more cameras on the sharing device in real time or at an earlier time. In some examples, some or all of the photos may be individual frames from a video stream captured by a video camera on the sharing device. The photos making up the panorama may also include photos taken by a different sharing device in real time or at an earlier time.

The panorama may cover the entire 360 degrees of view from the sharing device. For example, the panorama may include a "photo bubble," i.e., a photographic representation of the entire visible area from the physical location of the sharing device when looking in all possible directions. Alternatively, the panorama may only include photographic representations of visible areas when looking in some of the possible directions. For instance, the panorama may cover 180 degrees of view, centered at the current point of view of the sharing device. Other ranges are also possible, depending on the photographic capability of cameras on the sharing device as well as the desired sharing experience of the users.

Overlapping photos may be stitched together to form a single panorama. In one example, photos may be stitched together by recognizing certain objects within the images. Images that share a certain object may be overlapped based on the location of the object within each image. Additionally, easily distinguishable visual features in the image such as corners of an object may be used to properly place images within the panorama. Information regarding the orientation of cameras on the sharing device in the environment may also be used to place the photos in the proper position within the panorama. This information may come from orientation sensors located on the sharing device.

In an additional example, overlapping images can be used to generate a more refined image for a given section of the panorama. A super-resolution algorithm can generate a more refined image from an initial image using information from overlapping images. After factoring in differences in position and rotation, an initial image may be adjusted based on differences between the initial image and the overlapping images. In some examples, previously-generated images may be combined with additional, perhaps later-captured, images to generate more refined images. The panorama may be progressively refined as more images become available.

Overlapping images may be combined to generate the panorama in a variety of ways. For example, suppose two example images are taken: image1 and image2. Each of image1 and image2 are images of separate six-meter wide by four-meter high areas, where the widths of the two images overlap by one meter. Then, image1 can be combined with image2 to generate an panoramic image of a eleven-meter wide by four-meter high area by aligning images image1 and image2 and then combining the aligned images using an average or median of the pixel data from each images. In an alternative example, the pixel data of the more recently-taken image may be given a greater weight. In yet another example, each region in the panoramic image can be taken from only one of images image1 or image2. Other techniques for generating panoramic and/or processed images can be used as well or instead.

In a further example, the panorama may also include previously stored photos of the environment. For instance, a database of photos corresponding to different physical locations could be previously stored. These photos may be used to fill in portions of the panorama not covered by pictures taken by cameras on the sharing device. Further, the panorama may be updated as more photos become available.

Older photos may be replaced with more current photos of portions of the environment. In an additional example, if all the photos making up the panorama are previously stored photos, the step 302 of method 300 of determining the still photo panorama may be completed at an earlier point in time than the other steps.

The step 304 of method 300 may involve receiving a video stream of a first portion of the environment from a video camera on the sharing device. The video stream may come from a point-of-view video feed captured by a video camera on a wearable computing device, for example. The video stream may include continuous streaming video date or discrete portions of video data. In another example, the video stream may be a three-dimensional (3D) video feed (e.g., video created by two cameras that is combined to create 3D video).

The method 300 may then involve determining a registration data stream which indicates the location and orientation of the video stream within the still photo panorama, as shown by block 306. Sensors on the viewing device may be used to determine the orientation of the video camera on the viewing device relative to the scene being captured. As the camera(s) on the viewing device change orientation, the position and orientation of the video stream relative to the still photo panorama may change. The registration data stream may be a continuous stream of data indicating the location and orientation of the video stream relative to the panorama. Alternately, the registration data stream may contain discrete updates when the position and/or orientation of the video stream has changed within the panorama.

In a further example, determining the registration data stream may depend in part on specific images in the environment. For example, if location and orientation data is imprecise or gets disrupted, specific objects in the environment can be matched to previously captured images of the objects within the environment in order to locate the video stream within the panorama. Additionally or alternatively, specific pixel patterns within the panorama may be matched to frames from the video stream in order to locate the video stream within the panorama.

The method 300 may involve transmitting the video stream and the registration data stream to one or more viewing devices, as shown by block 308. The transmission may occur in real time while the video stream is being captured or it may begin at a later time. Additionally, portions of the still photo panorama and/or updates to the panorama may be transmitted to the viewing devices as well. The transmission may be sent directly from a viewing device or it may be sent through or from a backend server system. The transmission may occur continuously or it may be in the form of discrete packets of data sent at various intervals.

Accordingly, the method 300 may facilitate the viewing of the environment by one or more viewing devices. The viewing devices may display an augmented panorama that contains a live video stream that moves within the panorama according to the registration data stream. The display may additionally contain a separate field of view so that viewers may navigate around the augmented panorama. Viewers may also align their view with the live video stream in order to view a live video feed.

Figure 4:
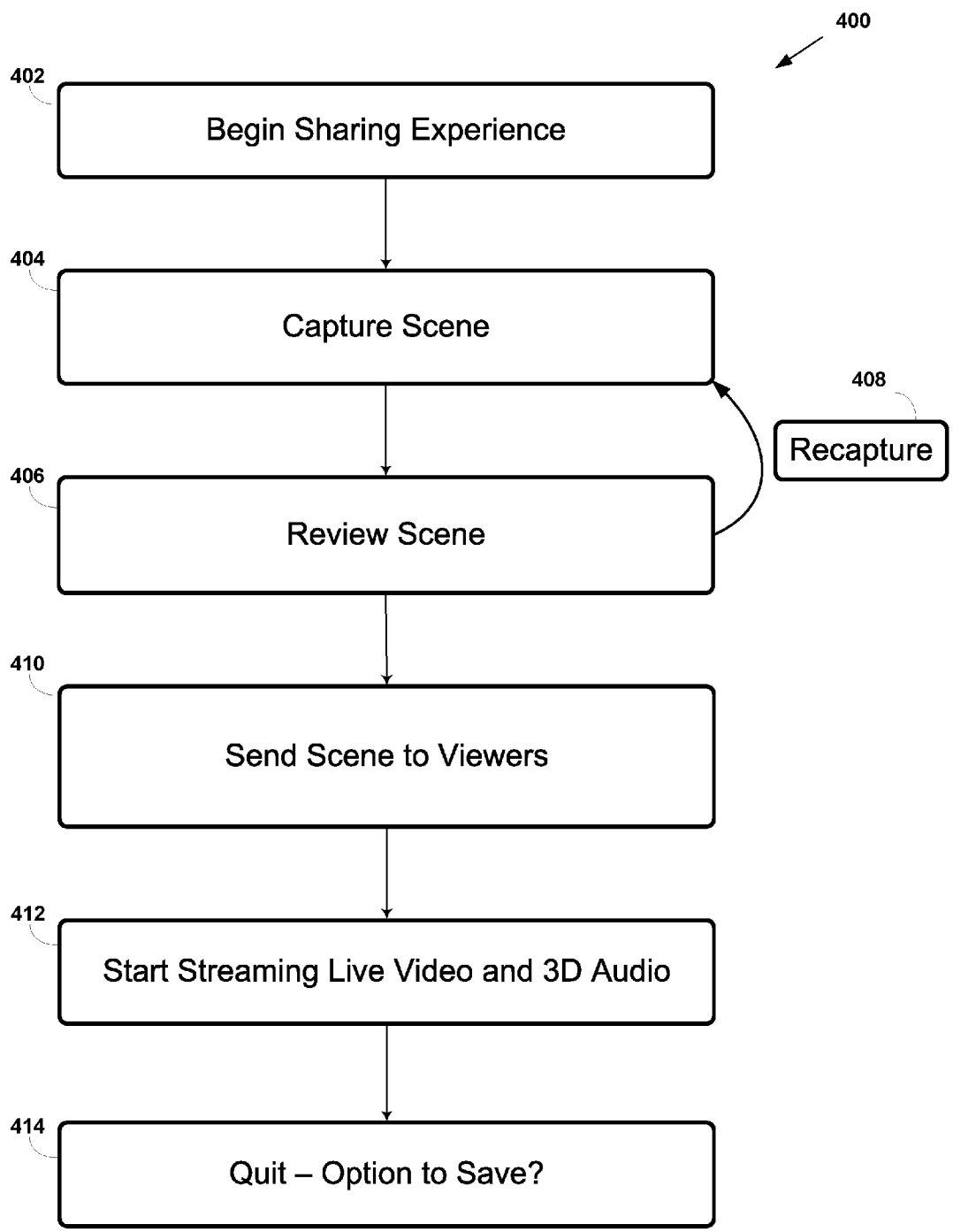
FIG. 4 is an interaction flow diagram, according to an example embodiment.

FIG. 4 is an interaction flow diagram, according to an example embodiment. A user of a viewing device, such as an HMD, may decide to begin a sharing experience, as shown by block 402. The user may begin the sharing experience by giving a verbal command to the device or otherwise inputting a specific command, for instance. The user may be given the option to select one or more viewers before starting the capture process.

Figure 5:
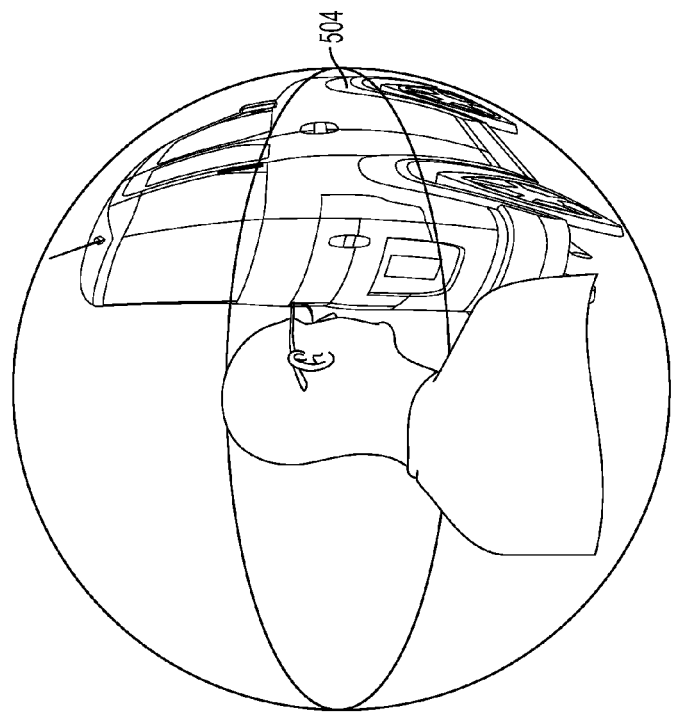
FIG. 5 illustrates the capture of a still photo panorama, according to an example embodiment.
Figure 5:
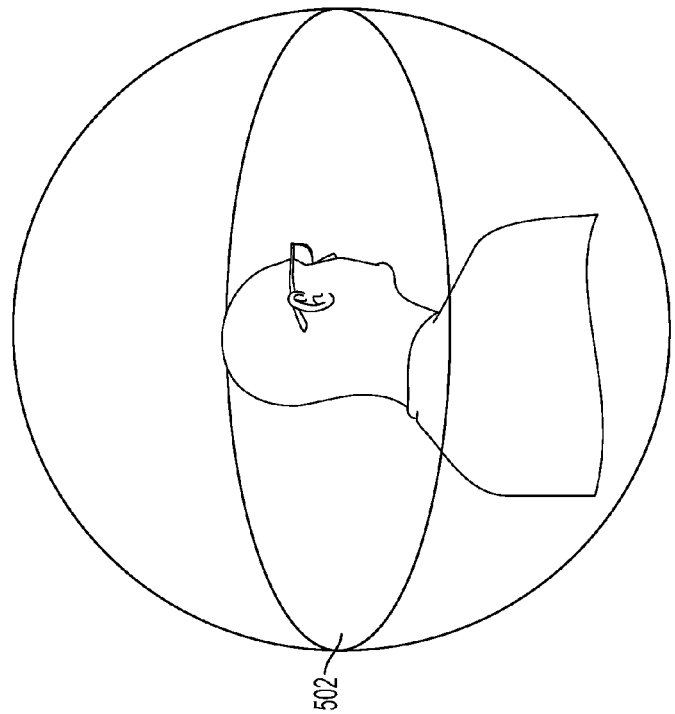

The user may begin capturing a scene within the environment, as shown by block 404. This process may involve determining a still photo panorama using the methods described above. FIG. 5 shows an example of the screen capture process. As shown in 502, the panorama may initially be blank. The user of the HMD may then build up the panorama by looking around in different directions to cause one or more cameras on the HMD to collect images of different portions of the environment. A panorama may then be created using the collected images, as shown in 504. In one example configuration, the user may be given instructions by the HMD regarding where to look in order to fill in the panorama.

The user may be given the opportunity to review the captured scene before sharing it with the viewing devices, as shown by block 406. If the user chooses, the user may be able to recapture part or all of the panorama, as shown by block 408. Earlier images may be replaced by newer images, or the newer images may be stitched together with the older images in the manners described above in order to create more refined images for the panorama.

The user may then choose to send the panorama to the viewers, as shown by block 410. The user may start the sending process by giving a verbal command or a different input to the sharing device (e.g., tapping a touchpad on the HMD). The scene may be sent in individual pieces or all at once. Further, the scene may be updated over time as more images become available and/or as the user changes orientation. The scene may be updated continuously or at periodic intervals. In an alternative embodiment, the scene may be sent to the viewers automatically after a certain portion of the environment has been captured. For example, if images of a certain percentage of the environment have been incorporated into the panorama, the sending process may start.

The user may then choose to start streaming a live video stream and/or audio stream, as shown by block 412. Alternatively, the video and/or audio may begin streaming automatically after the user chooses to start sending the panorama. The video and/or audio streaming may also begin after a certain portion of the panorama has been captured and sent. The video stream may be a video feed from point-of-view video camera on the viewing device, as described above.

The audio stream could consist of a spatial audio feed and/or a non-spatial audio feed. For example, an HMD may contain one or more audio sensors located near the ears of the user wearing the viewing device. These sensors may capture a spatial audio signal of the background of the environment to send to the viewing devices so that the viewers may experience the same audio experience of the sender. Additionally, the HMD may also contain one or more audio sensors located near the mouth of the user wearing the viewing device. These sensors may capture a non-spatial audio signal to send to the viewing devices so that the sender may communicate directly with the viewers. In a further example, the spatial and non-spatial audio signals may be layered together so that the viewers can differentiate between the sender's voice and the 3D audio signal from the sender's environment. Signal processing on each audio signal may be done separately. The receivers may also be able to send audio signals back to the sender, so that two-way communication may be established. Other audio configurations are also possible.

The user may be given the option to pause and/or quit the sharing experience, as shown by block 414. The user may also be given the option to save the sharing experience so that additional viewers may view the experience at a later time. The saved data may include video stream(s), the still photo panorama, registration data stream(s) indicating the location and orientation of the video stream(s) within the panorama, periodic or continuous updates to the panorama, and/or audio stream(s), among other things.

Figure 6A:
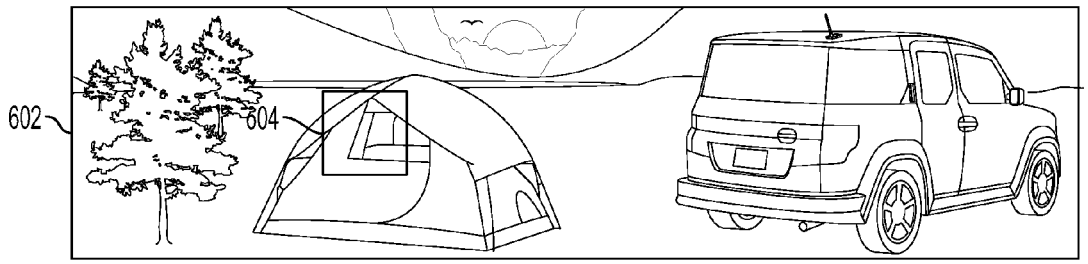
FIG. 6A illustrates a video stream within a still photo panorama, according to an example embodiment.

FIG. 6A shows a still photo panorama 602 and a video stream 604 within the still photo panorama. In an example embodiment, a user of a sharing device such as an HMD may be able to control the location and orientation of the video stream 604 within the panorama 602. A registration data stream may be determined which indicates the location and orientation of the video stream 604 within the panorama 602. In a further example, the registration data stream may contain the 2D or 3D coordinates of the video stream 604 within the panorama 602. These coordinates may be world coordinates or they may be coordinates relative to a frame positioned on top of the panorama 602.

Figure 6B:
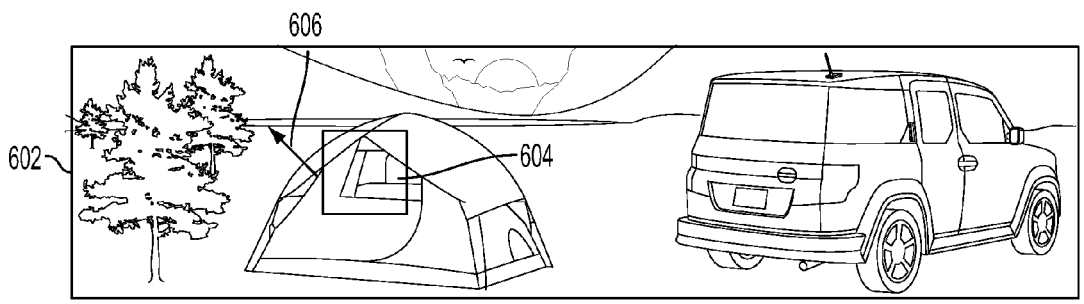
FIG. 6B illustrates a video stream and a visual cue within a still photo panorama, according to an example embodiment.

FIG. 6B shows a still photo panorama 602, a video stream 604, and a visual cue 606 indicating a direction that a sender must rotate her view in order to align her view with the view of a remote viewer. In an example embodiment, the sharing device may receive information about the locations and orientations within the panorama 602 that are being viewed by remote viewers. Visual cues may be shown to the sender in the form of arrows, triangles, or other indicators to indicate how the sender may align her view with a viewer. For instance, in FIG. 6B, a visual cue 606 is shown as an arrow pointing up and to the left. The visual cue 606 may indicate to the user that the user may align her view with a receiver by tilting her head up and to the left. Accordingly, the sender may be able to easily align the view of the video stream with the view of the receivers so that the receivers may see the live video stream rather than a still picture. In a further example, multiple viewers may be aggregated together to reduce the number of visual cues given to the sender. For example, the sender may only see a visual cue indicating where the most viewers are looking or where a certain number of viewers above a threshold number are looking.

Figure 6C:
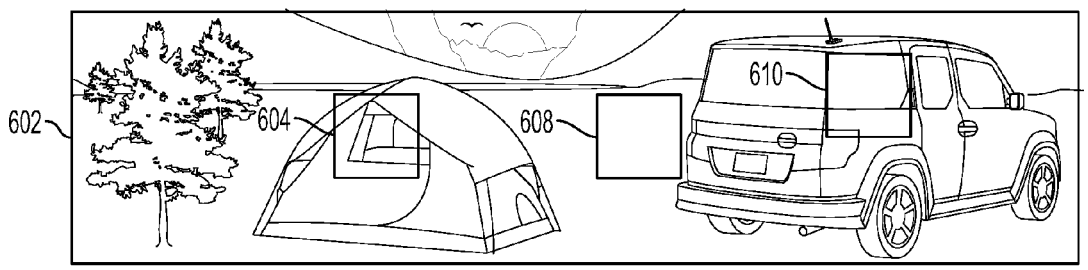
FIG. 6C illustrates multiple video streams within a still photo panorama, according to an example embodiment.

FIG. 6C shows a still photo panorama 602, a first video stream 604, a second video stream 608, and a third video stream 610. In some examples, the sharing device may contain multiple video cameras capable of capturing multiple video streams. For example, an HMD may contain one video camera aligned with the user's point of view and a separate video camera pointing backwards from the back of the user's head. Accordingly, two separate video streams may be captured by single device, and both video streams may be sent with the still photo panorama. Other configurations of cameras within sharing devices are also possible.

In a further example, video streams from multiple separate sharing devices may be captured. For instance, multiple HMD users at a football game may each function as viewers. A separate video stream may be captured by each user. For instance, three separate users may each capture one of the video streams 604, 608, and 610. A separate registration data stream may be determined for each of the video streams, indicating the location and orientation of the corresponding video stream within the still photo panorama. For example, the registration data streams may be determined by a back end server system that receives each of the video streams from the HMD's, along with location and orientation data from sensors on the HMD's. The panorama along with the three video streams and their corresponding registration data streams may then be transmitted to one or more viewing devices. The viewers may then have the option of panning around the panorama and viewing each of the live video streams.

B. Viewing a Panorama and a Video Stream with a Separate Field of View

Figure 7:
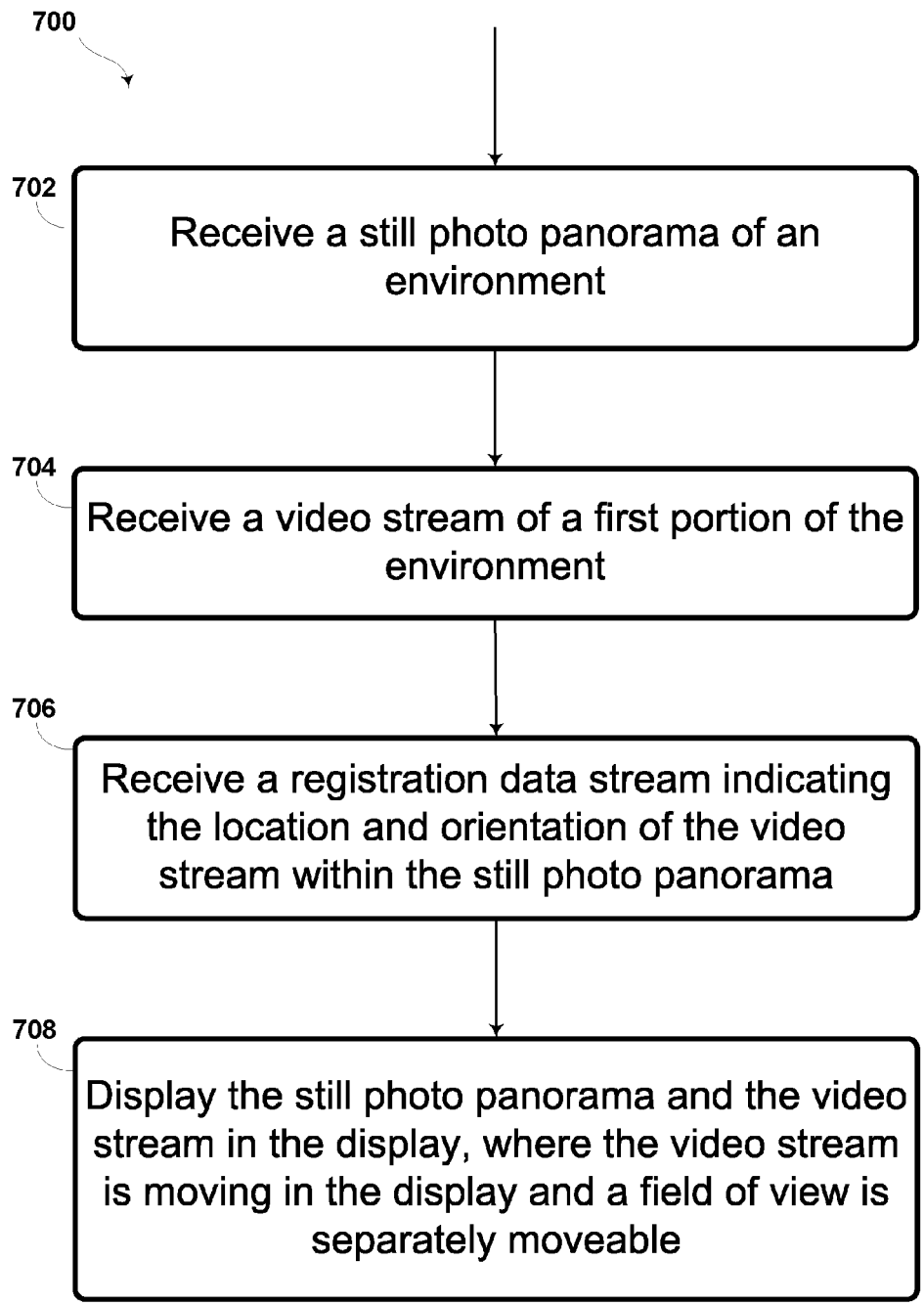
FIG. 7 is a flow chart illustrating a method, according to an example embodiment.

FIG. 7 is a flow chart illustrating a method 700, according to an example embodiment. In particular, method 700 may be implemented to display a still photo panorama of an environment with a video stream of a portion of the environment that is moving relative to the panorama based on a registration data stream. In one example, method 700 may be carried out by a viewing device, which may be a wearable computing device such as an HMD. In another example, the viewing device may be a computer with a pointing device. In a further example, the viewing device may be a smartphone. Other viewing devices that provide a user with an ability to navigate around a panorama may also be used.

More specifically, method 700 may involve receiving a still photo panorama of an environment, as shown by block 702. The method 700 may further involve receiving a video stream of a portion of the environment, as shown by block 704. The method 700 may additionally involve receiving a registration data stream which indicates the location and orientation of the video stream within the still photo panorama, as shown by block 706. Further, the method 700 may involve displaying the still photo panorama and the video stream in a display, where the video stream is moving within the display based on the registration data stream and where a field of view of the display is separately moveable by a user, as shown by block 708.

The step 702 of method 700 may involve receiving a still photo panorama of an environment. The still photo panorama may include 2D and/or 3D images. The still photo panorama may be a picture of a certain portion of an environment of a sharing device or multiple sharing devices which may be the result of combining several photos of the environment. The panorama may be received from a sharing device or from a server system in communication with a sharing device, for example.

In a further example, the panorama may also include previously stored photos of the environment. In an additional example, if all the photos making up the panorama are previously stored photos, the panorama may be predetermined. Accordingly, the panorama may be stored on the viewing device or in a remote database. In such an example, the step 702 of receiving the still photo panorama may involve receiving a portion or all of the panorama from one of these locations.

The panorama may cover the entire an 360 degrees of view. For example, the panorama may include a "photo bubble," i.e., a photographic representation of the entire visible area from the physical location of the sharing device when looking in all possible directions. Alternatively, the panorama may only include photographic representations of visible areas when looking in some of the possible directions. For instance, the panorama may cover 180 degrees of view. Other ranges are also possible.

The panorama may be received all at once. Alternatively, the panorama may be received in individual parts, such as separate portions of the environment. In an additional example, separate parts of the panorama may be received at separate points in time in order to accommodate data limitations of the sending and/or receiving systems. In a further example, separate parts of the panorama may be received at separate points in time as additional photos are captured, making more parts of the panorama available.

The step 704 of method 700 may involve receiving a video stream of a first portion of the environment. The video stream may be received from a point-of-view video feed captured by a video camera on a wearable computing device, for example. In an additional example, the video stream may be received from a server system in communication with a device that is capturing the video stream. The video stream may include continuous streaming video date or discrete portions of video data. In another example, the video stream may be a three-dimensional (3D) video feed (e.g., video created by two cameras that is combined to create 3D video).

The method 700 may involve receiving a registration data stream which indicates the location and orientation of the video stream within the still photo panorama, as shown by block 706. In a further example, the registration data stream may contain the 2D or 3D coordinates of the video stream within the panorama. These coordinates may be world coordinates or they may be coordinates relative to a frame positioned on top of the panorama. The registration data stream may be a continuous stream of data indicating the location and orientation of the video stream relative to the panorama. Alternately, the registration data stream may contain discrete updates when the position and/or orientation of the video stream has changed within the panorama.

The method 700 may involve displaying the still photo panorama and the video stream in a display, as shown by block 708. The video stream may be moving within the display based on the registration data stream. For instance, if an HMD user is sending the video stream, the HMD user may be looking around the environment. Accordingly, the video stream may move relative to the still photo panorama to reflect where the sender is looking. Further, the display may contain a field of view that is separately movable within the display. Accordingly, the receiver may align her view with the sender to view the live video stream or may choose to look around the environment in different directions by panning around the still photo panorama.

In a further example, the step of displaying the panorama and the video stream as shown by block 708 may occur at a later point in time than the other steps. For instance, the information necessary to view the experience (including, for example, the still photo panorama, the video stream, and/or the registration data stream) may be received at one point in time. However, the user may choose not to view the experience in real time, but may instead choose to playback the experience at a later point in time. Each viewing experience may be different as the user may be able to view different portions of the environment during each viewing experience.

Figure 8:
FIG. 8 illustrates the sharing of a still photo panorama, according to an example embodiment.
Figure 8:
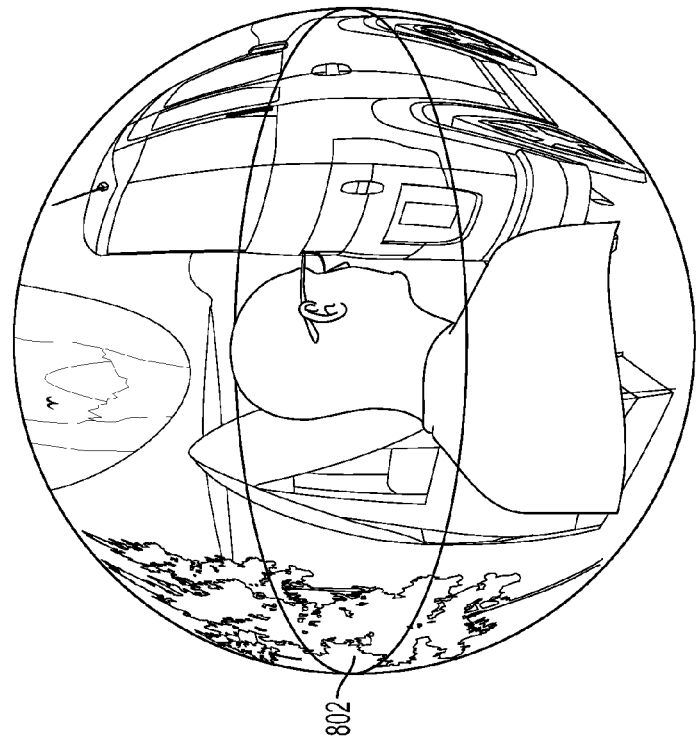

FIG. 8 illustrates the sharing of a still photo panorama, according to an example embodiment. As can be seen in 802, a sharing device may be an HMD and the user of the HMD may create a "photo bubble," a panoramic view of the environment created using images captured by cameras on the HMD. A viewing device such as an HMD may then be used by a viewer to view the panorama, as shown by 804. As shown in 802 and 804, the sender and the receiver may be looking at different portions of the panorama at the same time. Accordingly, the receiver may be able to experience the sender's environment while separately controlling her orientation within the environment.

In another example embodiment, the viewer may use a laptop with a pointing device such as a mouse or touchpad to view environment. The viewer may be able to pan around the still photo panorama by moving a pointer on the screen. When the viewer aligns her point of view with the sender, the viewer may be able to see the live video stream instead of the still photo panorama.

In a further example, the viewer may use a smartphone to view the environment. Moving the smartphone in space may cause the device to display a different portion of the "photo bubble," or panorama captured by the sender. In some examples, the smartphone may contain an orientation sensor that may be used to determine which portion of the panorama is visible to the user in a manner similar to an orientation sensor on an HMD. Alternatively, the user of the smartphone could navigate around the environment by using a touchpad or touch-sensitive screen. Other configurations and other viewing devices are also possible.

The viewer may also receive a spatial audio feed and/or a non-spatial audio feed. The spatial audio signal may be a 3D audio signal that allows a viewer to experience the same audio experience as the sender. Additionally, a viewer may also receive a non-spatial audio so that the sender may communicate directly with a viewer. In a further example, the spatial and non-spatial audio signals may be layered together so that a viewer can differentiate between the sender's voice and the 3D audio signal from the sender's environment. Signal processing on each audio signal may be done separately. A viewer may also be able to send audio signals back to the sender, so that two-way communication may be established. Other audio configurations are also possible.

Figure 9A:
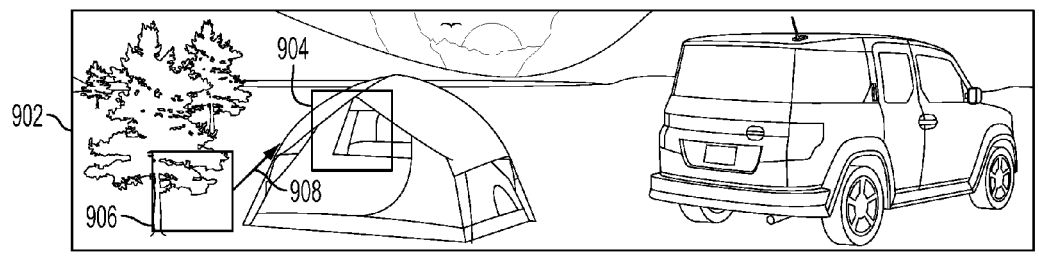
FIG. 9A illustrates a field of view and a video stream within a still photo panorama, according to an example embodiment.

FIG. 9A illustrates a field of view and a video stream within a still photo panorama, according to an example embodiment. A viewer may be able to view an augmented panorama 902 that contains a video stream 904 which is moving within the panorama 902. A viewer may control a field of view 906 that is separately moveable within the panorama 902. In an example embodiment, the size of the field of view 906 may be the same size as the video stream 904. Other sizes are also possible. In an additional example, the size of the field of view 906 may be increased or decreased by the viewer. Accordingly, the viewer may able to zoom in or zoom out to view portions of the panorama 902 with different levels of magnification.

The video stream 904 may be moving within the augmented panorama 902 based on a registration data stream. The registration data stream may indicate where in the panorama 902 a video camera is being directed which is sending the live video stream 904. In an example embodiment, the display may contain a visual cue 908, such as an arrow or a triangle, which indicates to the viewer how to align her field of view 906 with the video stream 904. For instance, the visual cue 908 may be an arrow pointing up and to the right. The viewer may therefore align her field of view 906 with the video stream 904 by tilting her head up and to the right. Accordingly, the viewer may choose to align her field of view 906 with the video stream 904 in order to view a live video stream.

Figure 9B:
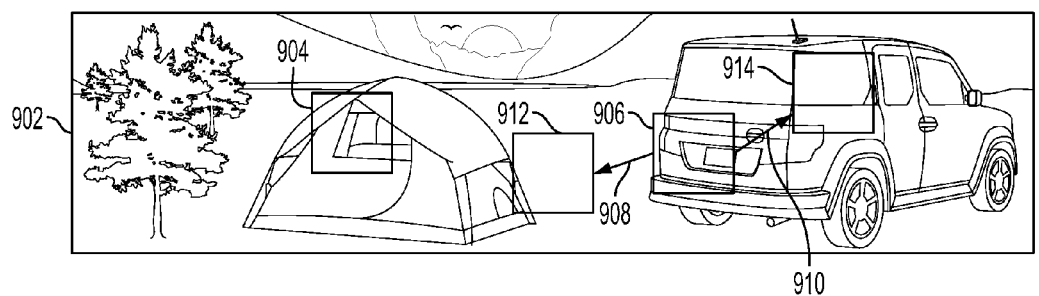
FIG. 9B illustrates a field of view and multiple video streams within a still photo panorama, according to an example embodiment.

FIG. 9B illustrates a field of view and multiple video streams within a still photo panorama, according to an example embodiment. The multiple video streams may be captured by separate video cameras on a single sharing device or by separate video cameras on separate sharing devices, for example. A viewer may be able to view an augmented panorama 902 that contains three separate video streams 904, 912, 914 which are each moving independently within the panorama 902. A viewer may control a field of view 906 that is separately moveable within the panorama 902. In an example embodiment, the size of the field of view 906 may be the same size as each of the video streams 904, 912, 914. Other sizes are also possible.

Each video stream 904, 912, 914 may be moving within the augmented panorama 902 based on a registration data stream. Each registration data stream may indicate where in the panorama 902 a video camera is being directed which is sending the corresponding live video stream. In an example embodiment, the display may contain a visual cue 908, 910, such as an arrow or a triangle, which indicates to the viewer where a video stream 912, 914 is relative to the viewer's current field of view 906. In one example, visual cues may only be displayed when a video stream is close to the viewer's current field of view. Accordingly, the viewer may choose to align her field of view 906 with a nearby video stream 912, 914 in order to view a live video stream. In a further example, each visual cue may have a different appearance or otherwise may signify to the viewer which video stream it corresponds to.

In an additional example embodiment, the viewer may be presented with separate visual cues indicating where another viewer is looking. For instance, if a sender is sending a video stream to two separate viewers, each viewer may have one visual cue indicating where the live video stream is and a separate, distinct visual cue indicating where the other viewer is looking. Other appearances and configurations of the visual cues are also possible.

IV. Example System Architecture

Figure 10:
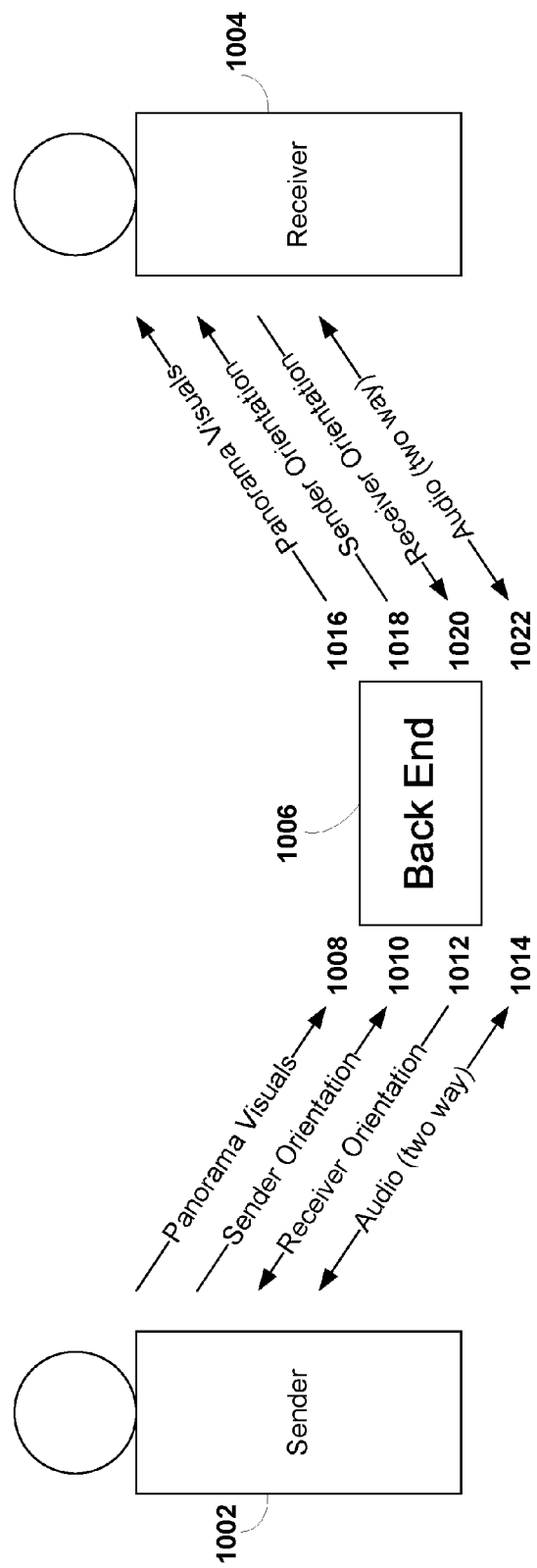
FIG. 10 illustrates an example system architecture, according to an example embodiment.

FIG. 10 illustrates an example system architecture, according to an example embodiment. As noted previously, in some exemplary embodiments, a remote server may help reduce the processing load of the sender and/or the receiver. In such embodiments, the sender and/or receiver may send certain data to a remote, cloud-based server system, which may function to distribute the data to the devices as needed. As part of a cloud-based implementation, the sender and/or receiver may communicate with the server through a wireless connection, through a wired connection, or through a network of wireless and/or wired connections.

As shown, a sender 1002 may share her viewing experience with a receiver 1004. Both the sender 1002 and the receiver 1004 may be in communication with a back end server system 1006, such as a cloud-based server system. In other example embodiments, multiple senders and/or multiple receivers may be in communication with the back end server system.

The sender 1002 may send certain data to the back end server system 1006. This data may include panorama visuals 1008, which may include a live video stream and/or captured still photos that may be used to create a still photo panorama. Multiple video streams may also be sent by the sender 1002 to the back end server system 1006. In other examples, the sender 1002 may determine a still photo panorama locally, in which case part or all of the still photo panorama may be sent to the back end server system 1006.

The sender 1002 may also send data relating to the sender's orientation 1010. This data may include world coordinates, local frame coordinates, and/or directions of view, for example. The back end server system 1006 may use this information to compute a registration data stream for the live video stream, for example.

The sender 1002 may also receive information about the orientation of the receiver 1012. This information may be used to create visual cues, indicating to the sender 1002 where in the environment the receiver 1004 is currently looking. Accordingly, the sender 1002 may choose to look in the same direction as the receiver 1004 in order to share a live video stream with the receiver 1004.

The sender 1002 may also send and/or receive audio signals to and/or from the back end server system 1006. The sender 1002 may be able to communicate by sending spatial and/or non-spatial audio signals to the receiver 1004. In some example embodiment, the sender 1002 may also receive audio signals from the receiver 1004 so that two-way audio communication may be established.

The receiver 1004 may receive certain panorama visuals 1016 from the back end server system 1006. In some example embodiments, the back end server system 1006 may have completed processing the panorama so that a complete still photo panorama may be sent to the receiver 1004 along with a live video stream. In other examples, some or all of the processing may be completed by the receiver 1004. For instance, the receiver 1004 may receive individual photos and may then determine the still photo panorama. In further examples, the back end server system 1006 and/or the receiver 1004 may have stored previous images of the environment that may be used to create some or all of the still photo panorama.

The receiver 1004 may also receive information regarding the sender's orientation 1018 from the back end server system 1006. In some examples, the back end server system 1006 may determine a registration data stream which indicates the location and orientation of the video stream within the still photo panorama. The registration data stream may then be transmitted to the receiver 1004. In other example, the receiver 1004 may receive coordinates, directions of view, and/or other information about the sender's orientation. The receiver 1004 may then determine a registration data stream indicating the location and orientation of the video stream within the still photo panorama.

The receiver 1004 may send information regarding the receiver's orientation 1020 to the back end server system 1006. This information may include coordinates, directions of view, and/or other information about the receiver's orientation. In some examples, the back end server system 1006 may use this information to send visual cues to the sender 1002 to indicate where in the still photo panorama the receiver 1004 is looking. In other examples, the back end server system 1006 may simply pass on the information about the receiver's orientation to the sender 1002 so that the sender 1002 may determine the visual cues locally.

The receiver 1004 may also send and/or receive audio signals to and/or from the back end server system 1006. The receiver 1004 may be able to receive spatial and/or non-spatial audio signals from the sender 1002. In some examples, the sender 1002 may be able to layer together spatial and non-spatial audio signals so that each signal can be understood by the receiver 1004. In some example embodiment, the receiver 1004 may also be able to send audio signals back to the sender 1002 so that two-way audio communication may be established.

FIG. 10 illustrates just one possible system architecture for carrying out the methods described above. Other configurations are also possible, including configurations that include multiple senders, multiple receivers, multiple server systems, and/or no back end server systems, among others.

V. Features to Protect Personal Information and the Identities of Persons

In the context of imaging of individuals or private property within a panorama, a service provider may implement systems and methods that control whether or not certain imagery is captured and/or how certain imagery is captured and/or used. For instance, images of a person's face and/or body may be removed or processed to obscure any identifying information (e.g., by blurring out the person's face). Additionally, images that include a person's home or private property may similarly be removed or processed to obscure the home or property. Furthermore, audio processing methods may be used to disguise the voice of any person speaking during a sharing experience.

Further, a system may implement certain image-capture strategies, image-filtering processes, and/or image processing in order to remove or obscure images that might be used to identity particular persons. For instance, systems may avoid capturing images, or capture lower resolution images, of certain locations that could be considered personal to given individuals, such as homes and residential areas. Further, to the extent an image includes visual information that might identify a particular individual, such as an individual's face and/or body, such areas of the image may be processed to obscure the identifying visual information (e.g., by blacking out, blurring, or removing such areas).

More generally, in situations in which the systems and methods discussed may collect personal information about users, or may make use of personal information, the users may be provided with an opportunity to control whether programs or features do or do not collect such user information (e.g., information about a user's social network, social actions or activities, profession, a user's preferences, or a user's current location). Further, the users may be provided with an opportunity to control whether and/or how such user information can be used to, e.g., send content and/or provides services that may be more relevant to the user.

In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Further, to the extent that a client device, such as a tablet, mobile phone, or personal computer, sends location data, user settings and/or preferences, and/or other data that may be considered personal or identifying in nature, the data may be formatted and/or processed such that the data may be linked to the client device, but not the user of the client device. For example, the data that is sent to a server by a given client device may be identified by an identifying code, such as a cryptographically strong hash code, which may be referred to as a "client ID." Such client IDs may not be associated with any user or user-account, and may simply indicate that data associated with the same client ID was provided by the same client device.

VI. Conclusion

It should be understood that the examples described with reference to a particular computing device such as an HMD are not meant to be limited to that device. It is contemplated that the example methods and systems described with reference to an HMD may be implemented on other types of computing devices, such as other types of wearable devices, mobile phones, tablet computers, and/or laptop computers, for instance.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:
1. A device comprising:
    a video camera;
    a processor;
    a non-transitory computer readable memory; and
    program instructions stored on the non-transitory computer readable memory and executable by the processor to perform operations comprising:
        receiving a live video of a plurality of portions of an environment from the video camera while the video camera pans over the plurality of portions of the environment;
        determining a registration data stream, wherein, for each respective image frame of the live video, the registration data stream indicates a location at which to place the respective image frame of the live video within a still photo panorama of the environment;
        transmitting the live video and the registration data stream to a remote viewing device;
        receiving, from the remote viewing device, live data indicative of a current location of a field of view of the remote viewing device within the still photo panorama, wherein the current location of the field of view indicates a portion of the panorama currently viewed by the remote viewing device;
        determining, based on the live data and the registration data stream, a current direction of the current location of the field of view of the remote viewing device within the still photo panorama relative to a current location of the live video within the still photo panorama; and
        providing for display of a visual cue indicating the determined current direction.

2. The device of claim 1, wherein the operations further comprise:
    determining the still photo panorama of the environment by stitching together image frames of the plurality of portions of the environment from the live video; and
    transmitting the still photo panorama to the remote viewing device.

3. The device of claim 1, wherein the location at which to place the respective image frame of the live video within the still photo panorama comprises coordinates of the respective image frame within the still photo panorama, and wherein the current location of the field of view of the remote viewing device within the still photo panorama comprises coordinates of the current location of the field of view within the still photo panorama.

4. The device of claim 1, wherein the registration data stream further indicates an orientation with which to place the respective image frame of the live video within the still photo panorama, and wherein the live data is further indicative of a current orientation of the field of view of the remote viewing device within the still photo panorama.

5. The device of claim 1, wherein the live video comprises a data stream representing the respective image frames of the live video.

6. The device of claim 1, wherein the visual cue indicating the current direction indicates a direction for a user of the device to move the video camera to align the current location of the live video with the current location of the field of view of the remote viewing device.

7. The device of claim 1, wherein the operations further comprise:
updating the still photo panorama by replacing a previously-captured image within the still photo panorama with a new image from the live video.

8. The device of claim 1, wherein the device is a head-mountable device (HMD).

9. The device of claim 8, wherein determining the registration data stream comprises using a sensor on the HMD to determine head-orientation data indicative of head orientation.

10. The device of claim 1, wherein the device further comprises an audio sensor, and wherein the operations further comprise:
receiving an audio signal from the audio sensor; and
transmitting the audio signal to the remote viewing device.

11. A device comprising:
a display;
a processor;
a non-transitory computer readable memory; and
program instructions stored on the non-transitory computer readable memory and executable by the processor to perform operations comprising:
receiving a video of a plurality of portions of an environment;
receiving a registration data stream, wherein, for each respective image frame of the video, the registration data stream indicates a location at which to place the respective image frame of the video within a still photo panorama of the environment to create an augmented panorama;
displaying a portion of the augmented panorama on the display, wherein the video is moving within the augmented panorama based on the registration data stream;
determining, based on the registration data stream, a current direction of a current location of the video within the augmented panorama relative to a current location, within the augmented panorama, of the portion of the augmented panorama displayed on the display; and
displaying, on the display, a visual cue indicating the current direction.

12. The device of claim 11, wherein the operations further comprise:
receiving the still photo panorama of the environment, wherein the still photo panorama comprises stitched-together image frames of the plurality of portions of the environment from the video.

13. The device of claim 11, wherein the operations further comprise:
moving, based on an input signal received by the processor, a field of view within the augmented panorama to control the portion of the augmented panorama displayed on the display.

14. The device of claim 13, wherein determining the current direction comprises:
determining the current direction when the video is outside the field of view.

15. The device of claim 13, wherein the display of the device comprises a display of a head-mountable device (HMD), and wherein the input signal for moving the field of view within the augmented panorama is based on had movement data received from a sensor on the HMD and indicative of head movement.

16. The device of claim 11, wherein the location at which to place the respective image frame of the video within the still photo panorama of the environment comprises coordinates of the respective image frame within the still photo panorama.

17. The device of claim 11, wherein the still photo panorama comprises a 360 degree panorama.

18. The device of claim 11, wherein the video is a live video.

19. The device of claim 11, wherein the operations further comprise:
determining a viewing direction indicating a direction of a current location, within the augmented panorama, of a field of view of another device viewing the augmented panorama relative to a current location, within the augmented panorama, of the portion of the augmented panorama displayed on the display; and
displaying, on the display, another visual cue indicating the determined viewing direction.

20. A non-transitory computer readable medium having stored therein instructions that, when executed by a computing device, cause the computing device to perform operations comprising:
receiving a video of a plurality of portions of an environment;
receiving a registration data stream, wherein, for each respective image frame of the video, the registration data stream indicates a location at which to place the respective image frame of the video within a still photo panorama of the environment to create an augmented panorama;
displaying a portion of the augmented panorama on a display of the computing device, wherein the video is moving within the augmented panorama based on the registration data stream;
determining, based on the registration data stream, a current direction of a current location of the video within the augmented panorama relative to a current location, within the augmented panorama, of the portion of the augmented panorama displayed on the display; and
displaying, on the display, a visual cue indicating the current direction.

* * * * *